(12) United States Patent
Chuang

(10) Patent No.: US 6,949,909 B2
(45) Date of Patent: Sep. 27, 2005

(54) SOLAR ENERGY PULSE CHARGE DEVICE

(76) Inventor: Chia-Chang Chuang, No. 8, Alley 3, Lane 2, Sec. 3, Fu-Shin Road, Taichung (TW)

( * ) Notice: Subject to any disclaimer, the term of this patent is extended or adjusted under 35 U.S.C. 154(b) by 98 days.

(21) Appl. No.: 10/727,458

(22) Filed: Dec. 4, 2003

(65) Prior Publication Data
US 2005/0134212 A1 Jun. 23, 2005

(51) Int. Cl.$^7$ .............................................. H01M 10/46
(52) U.S. Cl. ........................................................ 320/101
(58) Field of Search .............................. 320/101, 137, 320/140; 136/291, 292, 293

(56) References Cited

U.S. PATENT DOCUMENTS 3,696,286 A * 10/1972 Ule ............................ 320/101
6,057,665 A * 5/2000 Herniter et al. ............. 320/101
6,255,804 B1 * 7/2001 Herniter et al. ............. 320/137
2001/0019257 A1 * 9/2001 Bynum et al. .............. 320/141

* cited by examiner

Primary Examiner—Edward H. Tso
(74) Attorney, Agent, or Firm—Alan D. Kamrath; Nikolai & Mersereau, P.A.

(57) ABSTRACT

A solar energy pulse charge device includes a solar-powered panel and a charging unit connected to the solar-powered panel for saving the energy from the solar-powered panel. A control unit is electrically connected to the charging unit for controlling the charging unit to charge or discharge. A flyback circuit is electrically connected to the charging unit for providing multiple independent power sources each having a unique reference potential. A feedback voltage regulator circuit is electrically connected to the flyback circuit for control the flyback circuit in a constant voltage and a cyclic start circuit.

11 Claims, 4 Drawing Sheets

SOLAR ENERGY PULSE CHARGE DEVICE

BACKGROUND OF THE INVENTION

1. Field of the Invention

The present invention relates to a charge device, and more particularly to a solar energy pulse charge device.

2. Description of Related Art

In the subtropical zone, the sunlight is sufficient all the year. However, the weather becomes more and more hot due to a greenhouse effect so that the necessary amount of electric power is raised due to the temperature of the surrounding environment. Consequently, the amount of electric power is always limited in the summer. To use the solar energy is one of the solve methods of the limited amount of electric power. For example, to use the solar energy for street lamps can effectively achieve the purposes of economizing energy resources and environmental protection.

A town, for example, needs to pay a lot of money for the install cost, repair cost and electric bill for street lamps. Only the electric bill is a heavy burden of the local finance. However, a solar street lamp has a long use life and almost does not need to pay for electric bill. Consequently, the solar street lamp is considered to replace the conventional quicksilver street lamp.

However, the conventional solar energy charge device still charge the battery by floating charge way till full when the battery near a saturated condition. Consequently, the battery has no for a rest, is overcharged and cause a high temperature. As a result, the use life of the battery is shortened and the saving range of electric power is reduced.

The present invention has arisen to mitigate and/or obviate the disadvantages of the conventional solar energy charge device.

SUMMARY OF THE INVENTION

The main objective of the present invention is to provide an improved solar energy pulse charge device that is provided to replace the conventional floating charge device for extending the use life of the battery.

To achieve the objective, the solar energy pulse charge device in accordance with the present invention comprises a solar-powered panel and a charging unit connected to the solar-powered panel for saving the energy from the solar-powered panel. A control unit is electrically connected to the charging unit for controlling the charging unit to charge or discharge. A flyback circuit is electrically connected to the charging unit for providing multiple independent power sources each having a unique reference potential. A feedback voltage regulator circuit is electrically connected to the flyback circuit for control the flyback circuit in a constant voltage and a cyclic start circuit.

Further benefits and advantages of the present invention will become apparent after a careful reading of the detailed description with appropriate reference to the accompanying drawings.

DETAILED DESCRIPTION OF THE INVENTION

Figure 1:
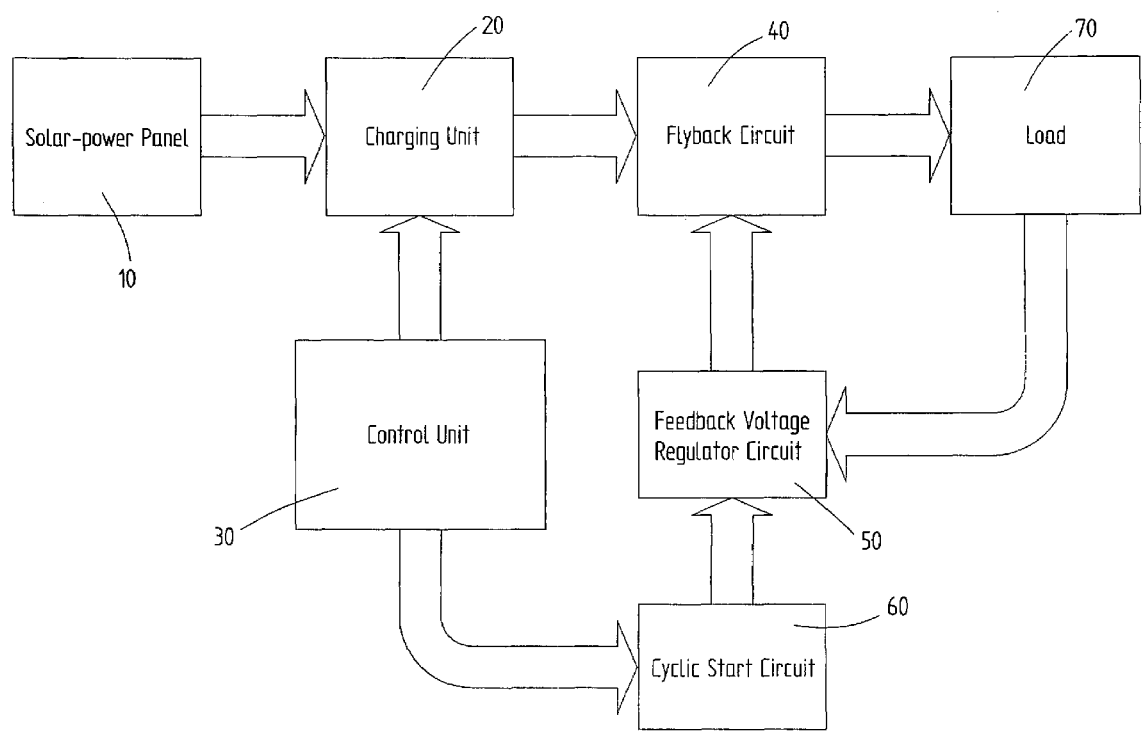
FIG. 1 is a block diagram of a solar energy pulse charge device in accordance with the present invention.
Figure 2:
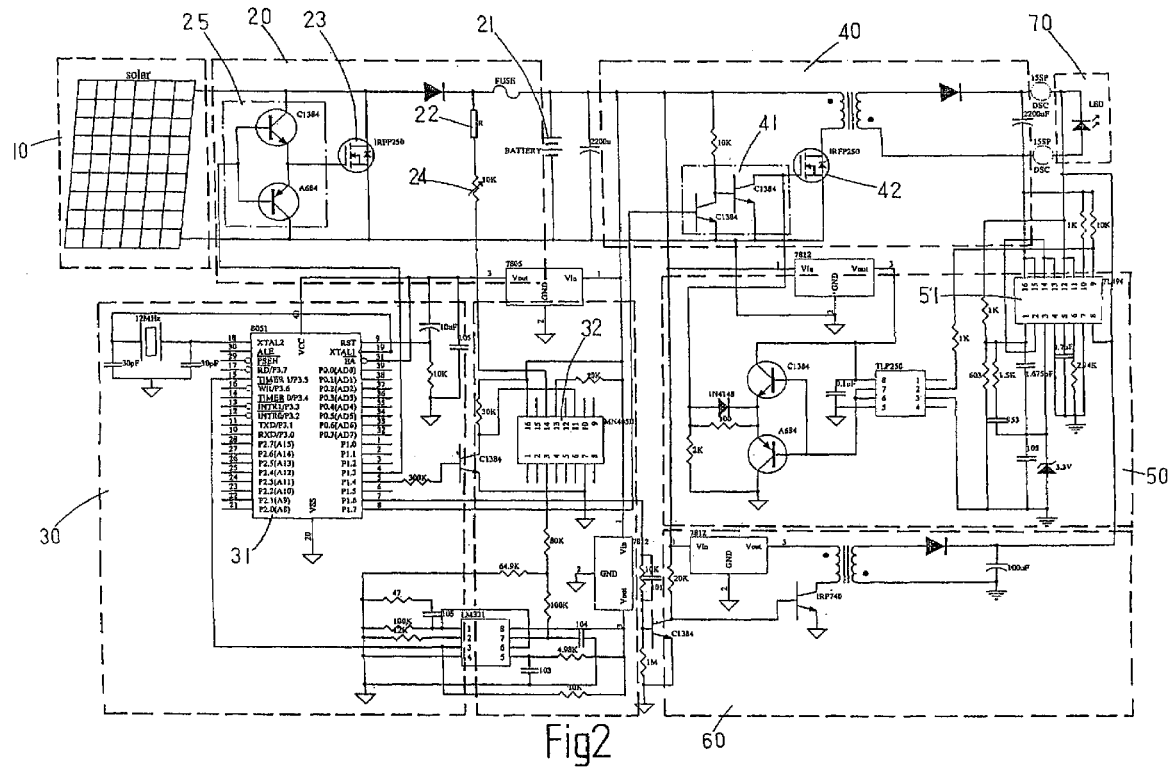
FIG. 2 is a circuit diagram of a solar energy pulse charge device in accordance with the present invention.

Referring to the drawings and initially to FIGS. 1–4, a solar energy charge device in accordance with the present invention comprises a solar-powered panel (10), a charging unit (20) connected to the solar-powered panel (10), a control unit (30) electrically connected to the charging unit (20), a flyback circuit (40) electrically connected to the charging unit (20), a feedback voltage regulator circuit (50) electrically connected to the flyback circuit (40) and a cyclic start circuit (60).

The solar-powered panel (10) is used as a power source of the present invention.

The charging unit (20) includes a battery (21) parallel connected to a light dependent resistor (22) and a charging switch (23). In the preferred embodiment of the present invention, the charging switch (23) is a metal-oxide-semiconductor field-effect transistor (MOSFET). A variable resistor (24) is series connected to the light dependent resistor (22). The charging unit (20) includes a first transistor switch (25) electrically connected to the control unit (30). The charging unit (20) can collect the power form the solar-powered panel (10) in a maximum efficiency and save the power in the battery (21). The control unit (30) drives the charging unit (20) to charge due to the first transistor switch (25) and the charging switch (23).

The control unit (30) includes a system-on-chip (SOC) (31) and a first integrated circuit (IC) (32). The SOC (31) has multiple pins respectively electrically connected to that of the first IC (32). The first IC (32) can transform the voltage signals from the light dependent resistor (22) of the charging unit into frequency signals that are transmitted to the SOC (31) for the SOC (31) to execute formula procedures.

The flyback circuit (40) includes a second transistor switch (41) and a closed switching regulator (42), wherein the SOC (31) of the control unit (30) controls the second transistor switch (41) and the second transistor switch (41) controls the closed switching regulator (42). In the preferred embodiment of the present invention, the closed switching regulator (42) is a MOSFET. The second transistor switch (41) closes the closed switching regulator (42) when receiving the signals from the SOC (31). The second transistor switch (41) and the closed switching regulator (42) execute a discharge control to the charging unit (20). The flyback circuit (40) is further electrically connected to a load (70). In the preferred embodiment of the present invention, the load (70) is a light emitting diode (LED). The flyback circuit (40) provides multiple independent power sources each having a unique reference potential.

The feedback voltage regulator circuit (50) includes a second IC (51) for measuring the voltage of the load (70) and controlling the flyback circuit (40) to make the load (70) in a constant voltage.

The cyclic start circuit (60) transmits back the frequency signals from the first IC (32) to the SOC (31) that controls the cyclic start circuit (60) for starting controlling the feedback voltage regulator circuit (50) and the flyback circuit (40).

Figure 3:
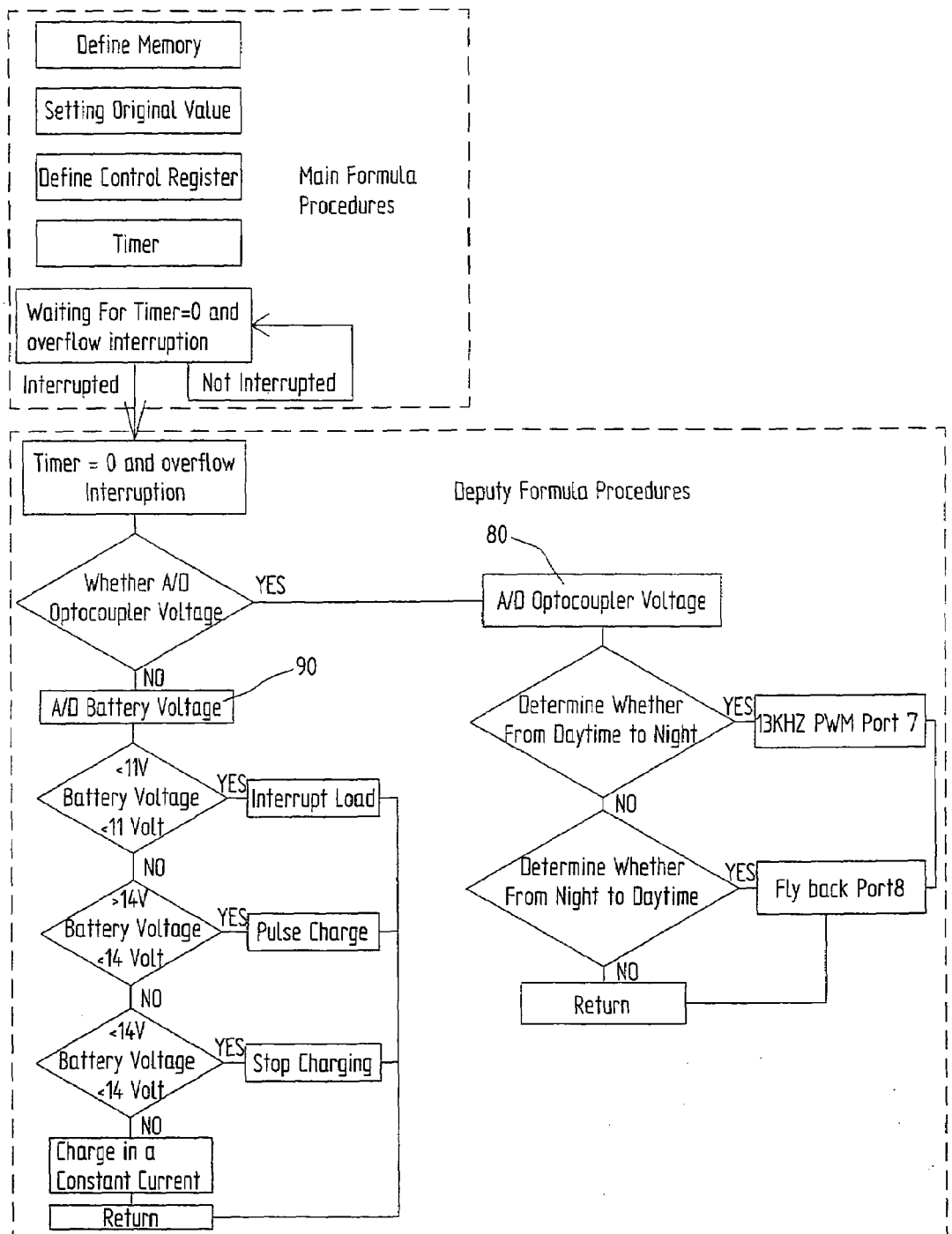
FIG. 3 is a flow chart of a solar energy pulse charge device in accordance with the present invention.

With reference to FIG. 3, the formula of the control unit (30) is defined as a memory and a register. A counter is started and interrupts a buffer overflow when the counter counts down within zero to determine that a formula interruption belongs to an A/D optocoupler (80) or not. If the formula interruption belongs to the A/D optocoupler (80), the system determines whether the moment is from day to night, otherwise the system determines whether the moment is from night to day.

When the moment being from daytime to night, firstly, the light dependent resistor (22) of the charging unit (20) will measure the luminosity of the surrounding environment. The first IC (32) of the control unit (30) will transform the voltage signals from the light dependent resistor (22) into frequency signals and transmit the frequency signals to the SOC (31) when the luminosity of the surrounding environment reaches the standard dark range of starting system. The action procedures of the formula control circuit of the SOC (31) will drive and start the cyclic start circuit (60) to make a capacitor in the cyclic start circuit (60) start saving energy for driving and starting the second IC (51) to cause a waveform of 13 KHz to the flyback circuit (40) and maintain a pulse width modulation (PWM) for three seconds for opening the closed switching regulator (42) to control the feedback voltage regulator circuit (50) and the flyback circuit (40). At the same time, the load (70) is started and the charging unit (20) is shut off. The feedback voltage regulator circuit (50) feedback stabilizes voltage of the flyback circuit to promote the saving ability of the coil in the flyback circuit (40) and provide a stable voltage source to the load (70) when the voltage from the battery (21) for the load (70) via the flyback circuit (40) is abated and measured by the second IC (51) of the feedback voltage regulator circuit (50). When the voltage of the battery (21) being under 11 volt, the SOC (31) transmits a high-volt signal-ON to the second transistor switch (42) of the flyback circuit (40) to close the closed switching regulator (42) and the power source of the load (70) for only providing electric power to the SOC (31) of the control unit (30) to prevent the control unit from a disconnection and assure the present invention in a regular operation.

When the moment being from night to daytime, the SOC (31) of the control unit (30) transmits a high-volt signal-NO to the second IC (41) of the flyback circuit (40) to make the circuit of the present invention be directly shortened after five seconds. As a result, the closed switching regulator (42) is closed and stops to provide electric power to the load (70), and the charging unit (20) is started and the battery (21) stops to provide electric power to the load (70).

The system will determine the voltage of the battery (21) of the charging unit (20) when the interruption is caused due to a voltage of the A/D battery (90) not to a formula from the A/D optocoupler (80).

The SOC (31) of the control unit (30) transmits a high-volt signal-LOW to the second transistor switch (41) of the flyback circuit (40) when the voltage of the battery (21) is under 11 volt. As a result, the closed switching regulator (42) is closed and stops to provide electric power to the load to prevent the present invention from overly discharging.

The SOC (31) of the control unit (30) transmits a high-volt signal-HIGH to the charging switch (23) of the charging unit (20) when the voltage of the battery (21) in over 14 volt. As a result, the charging switch (23) is conducted to make the main circuit of the solar-powered panel (10) be shortened and the charging unit stops to charge the battery (21) to prevent the battery (21) from being overly charged.

When the voltage of the battery (21) of the charging unit (10) being between 21.7 volt and 14 volt, the SOC (31) drives the battery (21) to intermittently receive the high and low potential via the first transistor switch (25) for controlling the charging switch (23) conducted in intermittence to automatically execute pulse charge. The charge method is executed to prevent the battery (21) from being over charged and extend use life of the battery (21).

Figure 4:
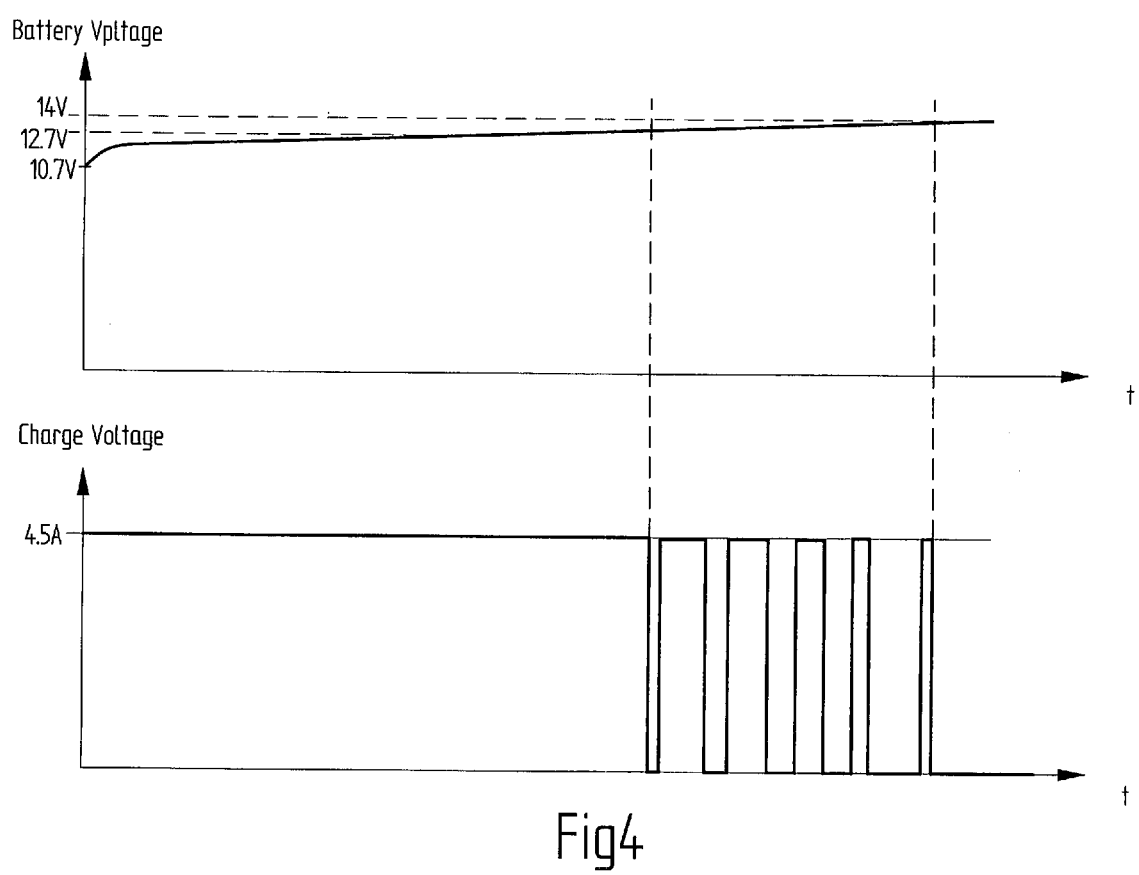
FIG. 4 is a battery charge curve and a constant current pulse wave charge curve of a solar energy pulse charge device in accordance with the present invention.

With reference to FIGS. 1 and 4, the present invention can provide a stable power source to an electric equipment, such as a street lamp, without any extra power source and the SOC (31) of the control unit (30) can determine the surrounding environment to execute charge or discharge. The SOC (31) is used to control all of the actions of the present invention so that the complication of the electric hardware is reduced for decreasing the manufacturing cost. Furthermore, the SOC (31) can effectively charge the battery (21) of the charging unit (20) and provide protections to the battery (21). For example, the present invention can continuously provide electric power to a street lamp for about seven days without any charging action.

In addition, the battery (21) of the charging unit (20) is charged in two phases.

In the first phase: the battery (21) of the present invention is charged in a constant electric current. The charging unit (20) can fully receive the all the energy from the solar-powered panel (10) so that the charging time of the present invention is shorter than that of conventional floating charge.

In the second phase: the battery (21) of the present invention is charged in pulse charge to prevent the battery (21) from being over heat and the battery (21) is in a relax condition during being charged to effective extend the use life of the battery (21).

The light dependent resistor (22) of the present invention is series connected to a variable resistor (24). Consequently, to adjust the resistant value of the variable resistor (24) is to adjust the sensibility of the light dependent resistor (22) of the charging unit (20) for suiting the surrounding environment.

Although the invention has been explained in relation to its preferred embodiment, it is to be understood that many other possible modifications and variations can be made without departing from the spirit and scope of the invention as hereinafter claimed.

What is claimed is:

1. A solar energy pulse charging device comprising:
   a solar-powered panel used as a power source of the solar energy charging device;
   a charging unit electrically connected to the solar-powered panel, the charging unit including a battery parallel connected to a light dependent resistor and a charging switch, a first transistor switch electrically connected to the control unit, the charging unit collecting the power form the solar-powered panel in a maximum efficiency and save the power in the battery;
   a control unit electrically connected to the charging unit and driving the charging unit to charge due to the first transistor switch and the charging switch, the control unit including a system-on-chip (SOC) and a first integrated circuit (IC), the SOC having multiple pins respectively electrically connected to that of the first IC, the first IC transforming voltage signals from the light dependent resistor into frequency signals that are transmitted to the SOC for the SOC to execute formula procedures;
   a flyback circuit electrically connected to the charging unit, the flyback circuit including a second transistor switch and a closed switching regulator, wherein the SOC of the control unit controls the second transistor switch and the second transistor switch controls the closed switching regulator, the second transistor switch closing the closed switching regulator when receiving the signals from the SOC, the second transistor switch and the closed switching regulator executing a discharge control to the charging unit, the flyback circuit is further electrically connected to a load and providing multiple independent power sources each having a unique reference potential;

a feedback voltage regulator circuit electrically connected to the flyback circuit, the feedback voltage regulator circuit including a second IC for measuring the voltage of the load and controlling the flyback circuit to make the load in a constant voltage; and a cyclic start circuit electrically connected to the feedback voltage regulator circuit, the cyclic start circuit transmitting back the frequency signals from the first IC to the SOC that controls the cyclic start circuit for starting controlling the feedback voltage regulator circuit and the flyback circuit.

2. The charging device as claimed in claim 1, wherein a variable resistor series connected to the light dependent resistor to adjust the sensibility of the light dependent resistor of the charging unit for suiting the surrounding environment.

3. The charging device as claimed in claim 1, wherein the charging switch is a metal-oxide-semiconductor field-effect transistor (MOSFET).

4. The charging device as claimed in claim 1, wherein the closed switching regulator is a metal-oxide-semiconductor field-effect transistor (MOSFET).

5. The charging device as claimed in claim 1, wherein the load is a light emitting diode (LED).

6. The charging device as claimed in claim 2, wherein the charging switch is a metal-oxide-semiconductor field-effect transistor (MOSFET).

7. The charging device as claimed in claim 2, wherein the closed switching regulator is a metal-oxide-semiconductor field-effect transistor (MOSFET).

8. The charging device as claimed in claim 2, wherein the load is a light emitting diode (LED).

9. The charging device as claimed in claim 3, wherein the closed switching regulator is a metal-oxide-semiconductor field-effect transistor (MOSFET).

10. The charging device as claimed in claim 3, wherein the load is a light emitting diode (LED).

11. The charging device as claimed in claim 4, wherein the load is a light emitting diode (LED).

* * * * *